US012707521B2

(12) United States Patent
Fang et al.

(10) Patent No.: US 12,707,521 B2
(45) Date of Patent: Aug. 11, 2026

(54) DATA TRANSMISSION IN AN INACTIVE STATE

(71) Applicant: ZTE Corporation, Shenzhen (CN)

(72) Inventors: Jianmin Fang, Shenzhen (CN); He Huang, Shenzhen (CN); Zhihong Qiu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 451 days.

(21) Appl. No.: 18/161,306

(22) Filed: Jan. 30, 2023

(65) Prior Publication Data

US 2023/0171835 A1 Jun. 1, 2023

Related U.S. Application Data

(63) Continuation of application No. PCT/CN2020/106179, filed on Jul. 31, 2020.

(51) Int. Cl.
*H04W 76/19* (2018.01)
*H04W 72/044* (2023.01)
*H04W 76/18* (2018.01)
*H04W 76/27* (2018.01)

(52) U.S. Cl.
CPC ......... *H04W 76/18* (2018.02); *H04W 72/046* (2013.01); *H04W 76/27* (2018.02)

(58) Field of Classification Search
CPC ..... H04W 76/27; H04W 76/19; H04W 76/18; H04W 24/10; H04W 72/046; H04W 24/02
See application file for complete search history.

(56) References Cited

U.S. PATENT DOCUMENTS

| | | | | |
|---|---|---|---|---|
| 2014/0242962 | A1 | 8/2014 | Choi et al. | |
| 2018/0270871 | A1 | 9/2018 | Mallick et al. | |
| 2020/0045669 | A1 | 2/2020 | Hwang et al. | |
| 2020/0128443 | A1 | 4/2020 | Na et al. | |
| 2020/0281040 | A1 * | 9/2020 | Kim ...................... | H04W 76/25 |

(Continued)

FOREIGN PATENT DOCUMENTS

| | | |
|---|---|---|
| CN | 108924853 | 11/2018 |
| CN | 110022567 | 7/2019 |
| JP | 2008-54102 | 3/2008 |

(Continued)

OTHER PUBLICATIONS

Extended European Search Report for Co-Pending EP Application No. 20946932.9, mailed on Jul. 20, 2023 (11 pages).

(Continued)

*Primary Examiner* — Anez C Ebrahim
(74) *Attorney, Agent, or Firm* — Ashurst Perkins Coie LLP US

(57) ABSTRACT

The present application relates to methods, systems, and devices related to digital wireless communication, and more specifically, to techniques related to data transmission in an inactive state. In one exemplary aspect, a method for data communication is disclosed. The method includes identifying, by a terminal, that a data transmission with a network node has failed while the terminal is in an inactive state. The method also includes transmitting, by the terminal, a set of information relating to the failure of the data transmission to a network node responsive to the terminal transitioning to a connected state in which the terminal is connected to the network node.

20 Claims, 8 Drawing Sheets

(56) References Cited

U.S. PATENT DOCUMENTS

2022/0159552 A1* 5/2022 Chang .................. H04W 76/18

FOREIGN PATENT DOCUMENTS

| | | |
|---|---|---|
| JP | 2014-171007 | 9/2014 |
| JP | 2015-146645 | 8/2015 |
| JP | 2017-143466 | 8/2017 |
| KR | 2020-0016151 | 2/2020 |
| WO | 2019/134644 | 7/2019 |
| WO | 2020/067825 | 4/2020 |
| WO | 2020/148483 | 7/2020 |

OTHER PUBLICATIONS

Huawei, et al. "Addition of SON features" 3GPP TSG-RAN3 Meeting #108-e E-meeting, Jun. 1-11, 2020, R3-204481, 157 pages.
Final Office Action for Co-Pending JP Application No. 2023-505926, mailed on Jul. 23, 2024 (8 pages with machine translation).
Office Action for Co-Pending JP Application No. 2023-505926, mailed on Feb. 19, 2024 (8 pages with machine translation).
ZTE Corp. "Work Item on NR smalldata transmissions in INACTIVE state" 3GPP TSG RAN Meeting #88e eMeeting, Jun. 29-Jul. 3, 2020, RP-201305, 7 pages.
CMCC "Presentation of Specification to TSG: TS 38.314, Version 1.0.0" 3GPP TSG-RAN Meeting #88e Electronic Meeting, Jun. 29-Jul. 3, 2020, RP-200785, 21 pages.
International Search Report and Written Opinion for International Application No. PCT/CN2020/106179, mailed on Apr. 29, 2021 (9 pages).
MediaTek Inc. "Discussion on early measurement configuration upon state transition" 3GPP TSG-RAN WG2 #107bis R2-1913835, Prague, Czech Republic, Aug. 26-30, 2019, Agenda Item: 6.10.3, 2 pages.
Office Action for Co-Pending CN Application No. 202080104606.3, mailed on Jul. 22, 2025 (20 pages with machine translation).
JPO, Decision to Grant for Japanese Application No. 2023-505926, mailed on Feb. 14, 2025, 6 pages with unofficial English translation.
CNIPA, Second Office Action for Chinese Application No. 202080104606.3, mailed on Jan. 13, 2026, 24 pages with unofficial English translation.
Substantive Examination Result Phase I for co-pending Indonesian Patent Application No. P00202301553, dated Apr. 22, 2026, 7 pages with unofficial English translation.
Decision of Rejection for co-pending Chinese Patent Application No. 202080104606.3, dated Apr. 11, 2026, 54 pages with unofficial English translation.

* cited by examiner

DATA TRANSMISSION IN AN INACTIVE STATE

CROSS-REFERENCE TO RELATED APPLICATION

This application is a continuation and claims priority to International Application No. PCT/CN2020/106179, filed on Jul. 31, 2020, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to data transmission in an inactive state.

In one exemplary aspect, a method for data communication is disclosed. The method includes identifying, by a terminal, that a data transmission with a network node has failed while the terminal is in an inactive state. The method also includes transmitting, by the terminal, a set of information relating to the failure of the data transmission to a network node responsive to the terminal transitioning to a connected state in which the terminal is connected to the network node.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the clauses.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

The present embodiments can relate to optimization of data transmission in an inactive state. The method of optimizing for data transmission in inactive state can be, for example, to avoid unnecessary signaling overhead and power consumption when performing the data transmission in the inactive state.

Figure 1:
FIG. 1 is an illustration of an example 5G network architecture.
Figure 1:
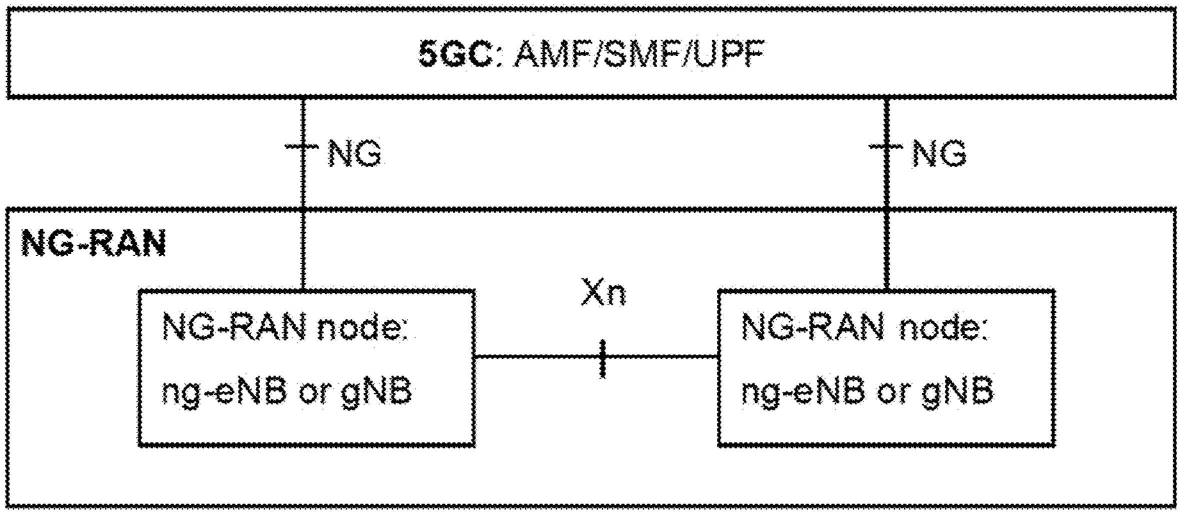

FIG. 1 is an illustration of an example 5G network architecture 100. As shown in FIG. 1, a fifth generation (5G) network architecture may include a 5G core network (5GC) and a next generation radio access network (NG-RAN). The 5GC may include any of an Access Mobility Function (AMF), a Session Management Function (SMF), and a User Plane Function (UPF). The NG-RAN may include base stations with different radio access technologies (RATs), such as an evolved 4G base station (ng-eNB), a 5G base station (gNB). The NG-RAN base station may be connected to the 5GC through the NG interface, and the NG-RAN base stations may be connected through the Xn interface.

An RRC_INACTIVE state has been introduced to provide an efficient state. A UE in such state can provide lower power consumption than in RRC_CONNECTED state, and can transfer to RRC_CONNECTED state with lower control plane latency than in RRC_IDLE state.

However, for the UE in RRC_INACTIVE state, since the data transmission without state transition may not be supported in the current standard, whenever the UE has data to transmit, the UE may have to enter RRC_CONNECTED state first and then initiate the data transmission. This may be a problem in case the data packet is small and infrequent, the UE may not be in RRC_CONNECTED state since the data packet is not so frequent, however the UE may need to be resumed to RRC_CONNECTED state and subsequently to be released to INACTIVE state for each data transmission, no matter the size of the data. This may result in unnecessary signaling overhead and power consumption, and also may be particularly severe in the case the data frequency is not sparse, but not so frequent to be considered to transfer to RRC_CONNECTED state.

The enablers for small data transmission in INACTIVE state in NR may include the Random Access Channel (RACH) based and configured grant type-1 (CG) based methods.

System Overview

The present embodiments relate to optimizing for data transmission in an inactive state. When a failure is detected by a UE upon initiating an INACTIVE data transmission or during an INACTIVE data transmission, various information types can be stored by the UE and reported to a network node after the UE goes to a CONNECTED state. The INACTIVE state may be, for example, the RRC_INACTIVE state described with respect to the 5G example herein.

The information can include a failure cause for the INACTIVE data transmission, including at least one of: rlc-MaxNumRetx (max number of RLC re-transmission), t310-Expiry, beamFailureRecoveryFailure, randomAccessProblem with raPurpose of INACTIVE data transmission, CG based transmission failure, failure due to in OOC (out of coverage), expiration of T319 timer, expiration of INACTIVE data transmission timer (start upon initiating the INACTIVE data transmission, stop upon receiving a release message from the network or expired), expiration of CG response check timer (start upon initiating the CG based INACTIVE data transmission, stop upon receiving a feedback to a UL data, a DL data, or a DL signaling from the network, or expired).

The information can also include an indication to indicate who triggers the INACTIVE data transmission (the UE or the network).

The information can also include a threshold for buffered data size (the INACTIVE data transmission is allowed when the buffered data size is < or <=the threshold), the threshold can be per UE, per DRB, per logical channel or per logical channel group.

The information can also include a threshold for tolerant time (the INACTIVE data transmission is allowed when the tolerant time of the ongoing data service type is > or >=the threshold).

The information can also include a current buffered data size, the current buffered data size can be per UE, per DRB, per logical channel or per logical channel group.

The information can also include information of supported solution (e.g. whether INACTIVE data transmission is supported, whether CG based solution is supported, whether CFRA (contention-free random access) based solution is supported, whether RACH based solution is supported, whether with RRC involved solution is supported, whether without RRC involved solution is supported), the information of supported solution can be per UE, per DRB, per logical channel, per logical channel group, per QoS flow, or per PDU session.

The information can also include information of selected solution (e.g. CG based solution is selected, CFRA based solution is selected, RACH based solution is selected, with RRC involved solution is selected, without RRC involved solution is selected).

The information can also include a status of radio resource (e.g. whether CG resource is valid, whether CFRA resource is valid, whether RACH resource with larger TB (Transport Block) size is valid, whether TA (Timing Advance) is valid).

The information can also include information of configured radio resource for INACTIVE data transmission (i.e. valid radio resource): For RACH based solution, the configured separate PRACH (Physical Random Access Channel) resource pool, separate MsgA PUSCH (Physical Uplink Shared Channel) resource pool, separate CORESET (control resource set)/Search Space for Msg2/MsgB reception, the configured CFRA resource. For CG based solution, the configured PUSCH CG resource, configuration for DL transmission, configuration for beam management, configured resource for PUCCH (Physical Uplink Control Channel)/SRS (Sounding Reference Signal), configured TA validity check timer, the configured multiple sets of CG configuration.

The information can also include information of selected radio resource for INACTIVE data transmission: the selected set of CG configuration.

The information can also include information of ongoing data service type (e.g. 5QI, DRB ID, logical channel ID, logical channel group ID, QoS flow ID, PDU session ID).

The information can also include a status of RLC, i.e. whether the RLC is released or not (when in INACTIVE state, the RLC may be suspended or released).

The information can also include a configured area scope (in which the INACTIVE data transmission is allowed), the area scope can be for all UEs, or for a specific UE.

The information can also include an indication to indicate that the UE has buffered data when the UE receives a release message from the NW (network).

The information can also include an indication to indicate whether the information (e.g. BSR or INACTIVE data transmission request indication) has been sent to the NW.

The information can also include an indication to indicate whether the data is included in the Msg3/MsgA when the UE is not the trigger (i.e. the NW is the trigger) for initial transmission type selection (e.g. initiate INACTIVE data transmission or resume to CONNECTED state, which type of INACTIVE data transmission to be performed: CG based or RACH based, with or without RRC involved).

The information can also include an information of fallback action (e.g. fallback from CG based to RACH based, from CFRA based to CBRA based, from without RRC involved to with RRC involved, fallback to normal resume: i.e. resume to CONNECTED state), The information can also include information of configured fallback trigger: e.g. the N of N times failure (the fallback is triggered when N times failure is reached).

The information can also include information of beam management: For RACH based INACTIVE data transmission, the time duration (with which the beam information derived based on the last RACH procedure is assumed valid), the beam information of the last RACH procedure, the beam information of the selected beam for INACTIVE data transmission, the time duration can be per cell, or per UE. For CG based INACTIVE data transmission, the preconfigured threshold (if any beam with CG resource above it, UE can initiate CG based, otherwise, UE initiates RACH based), the information of maintained SRS resource (to address the issue of beam change during INACTIVE data transmission).

The information can also include an indication to indicate whether it is allowed to use the RACH resource or the CG resource according to which one comes first.

The information can also include a configured value of CG response check timer.

The above INACTIVE data transmission failure information can be stored in the existing CEF (Connection Establishment Failure) report, RLF (Radio Link Failure) report, RA (Random Access) report or other specified report, or a new specified report (e.g. INACTIVE data transmission failure report, IDTF report).

When the IDTF report is adopted, an IDTF report available indication may be included in the RRCResumeComplete message, RRCReestablishmentComplete message, RRCReconfigurationComplete message, or RRCSetupComplete message to indicate the NW that the UE has IDTF report stored.

The NW may send an IDTF report request to the UE after received the IDTF report available indication from the UE, the UE sends an IDTF report response to the NW carrying the IDTF report after received the IDTF report request from the NW. The IDTF report request may be included in the UEInformationRequest message, the IDTF report response may be included in the UEInformationResponse message.

During the INACTIVE data transmission, the UE can derive a statistic. The statistic can include at least one of: UL data throughput per UE, DL data throughput per UE, UL Uu interface delay per UE, DL Uu interface delay per UE, UL data throughput per 5QI, DL data throughput per 5QI, UL Uu interface delay per 5QI, DL Uu interface delay per 5QI. The statistic result may be reported to the network node (or NW).

During the INACTIVE data transmission, the NW can derive a statistic including at least one of the following: UL data throughput per cell, DL data throughput per cell, UL Uu interface delay per cell, DL Uu interface delay per cell.

The NW may configure to the UE whether the INACTIVE data transmission is allowed for a UE according to the per UE statistic result.

The NW may configure to the UE whether the INACTIVE data transmission is allowed for a data service type or a QoS flow according to the per 5QI statistic result.

The NW may configure to the UE whether the INACTIVE data transmission is allowed in a cell according to the per cell statistic result.

In some embodiments, when the UE initiates an INACTIVE data transmission, the UE uses the RACH resource or the CG resource according to which one comes first, i.e., if the RACH resource comes first, to initiate a RACH based INACTIVE data transmission, if the CG resource comes first, to initiate a CG based INACTIVE data transmission.

In some embodiments, when the UE initiates a CG based INACTIVE data transmission, the UE starts a CG response check timer. If the UE does not receive any of a feedback to a UL data, a DL data, or a DL signaling from the network before the CG response check timer is expired, the UE can consider the CG based INACTIVE data transmission is failed. The CG response check timer can be started upon initiating the CG based INACTIVE data transmission and stopped upon receiving a feedback to a UL data, a DL data, or a DL signaling from the network, or expired.

In some embodiments, if UE is in RRC_INACTIVE state and in OOC, when UE has UL data for transmission, UE may not initiate the INACTIVE data transmission, UE may maintain in RRC_INACTIVE state and starts a timer O, UE may wait until the timer O expires or when back to normal coverage. If UE is back to normal coverage before the timer O expires, UE can initiate the INACTIVE data transmission. If UE is still in OOC when the timer O expires, UE can perform at least one of the following: goes to RRC_IDLE state, informs the upper layer that the data transmission is failed due to UE being in OOC.

If the INACTIVE data transmission is ongoing (e.g., the INACTIVE data transmission timer is running) and UE encounters OOC, UE can reset the INACTIVE data transmission timer to the value of timer O when the remaining time of INACTIVE data transmission timer is less than the value of timer O.

The value of timer O can be configured per cell, per data service type (e.g., per 5G Quality of Service Indicator (5QI)), per UE, per PDU session, per QoS flow, per DRB, per logical channel, or per logical channel group.

The value of timer O can be configured by the network to the UE via system information or dedicated signaling.

In some embodiments, MsgA PUSCH information used to specify the PUSCH allocation for MsgA in 2-step RACH procedure is exchanged between RAN nodes, or is sent from DU to CU. The MsgA PUSCH information may carried in the XN SETUP REQUEST, NG-RAN NODE CONFIGURATION UPDATE, XN SETUP RESPONSE, or NG-RAN NODE CONFIGURATION UPDATE ACKNOWLEDGE message, or carried in a new message, when exchanged between RAN nodes. The MsgA PUSCH information may carried in the GNB-DU CONFIGURATION UPDATE, or F1 SETUP REQUEST message, or carried in a new message, when sent from DU to CU.

Example Embodiment 1

Figure 2:
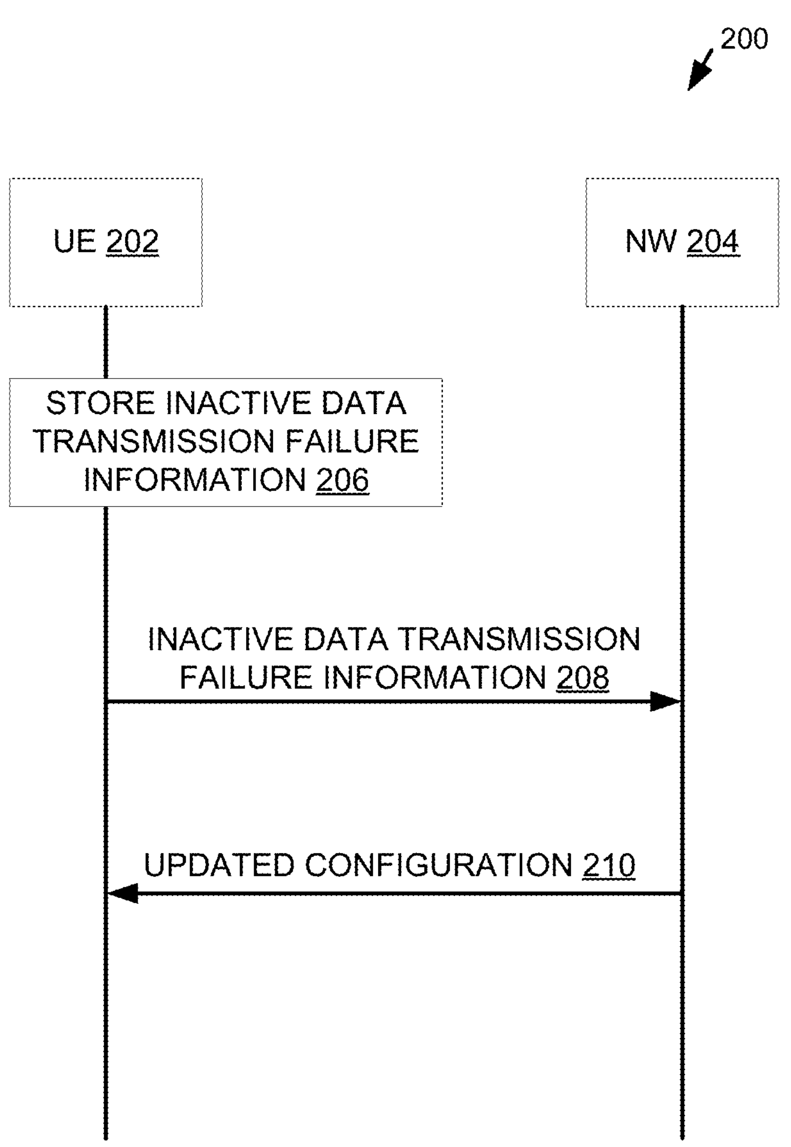
FIG. 2 illustrates a signaling process of an example inactive data transmission failure information reporting process.

FIG. 2 illustrates a signaling process 200 of an example inactive data transmission failure information reporting process. In step 206, the UE 202 can store inactive data transmission failure information responsive to detecting a failure of a data transmission.

The INACTIVE data transmission failure information can include a failure cause for the INACTIVE data transmission, including at least one of: rlc-MaxNumRetx (max number of RLC re-transmission), t310-Expiry, beamFailureRecoveryFailure, randomAccessProblem with raPurpose of INACTIVE data transmission, CG based transmission failure, failure due to in OOC (out of coverage), expiration of T319 timer, expiration of INACTIVE data transmission timer (start upon initiating the INACTIVE data transmission, stop upon receiving a release message from the network or expired), expiration of CG response check timer (start upon initiating the CG based INACTIVE data transmission, stop upon receiving a feedback to a UL data, a DL data, or a DL signaling from the network, or expired).

The INACTIVE data transmission failure information can include an indication to indicate who triggers the INACTIVE data transmission (the UE or the network).

The INACTIVE data transmission failure information can include a threshold for buffered data size (the INACTIVE data transmission is allowed when the buffered data size is < or <=the threshold), the threshold can be per UE, per DRB, per logical channel or per logical channel group.

The INACTIVE data transmission failure information can include a threshold for tolerant time (the INACTIVE data transmission is allowed when the tolerant time of the ongoing data service type is > or >=the threshold).

The INACTIVE data transmission failure information can include a current buffered data size, the current buffered data size can be per UE, per DRB, per logical channel or per logical channel group.

The INACTIVE data transmission failure information can include information of supported solution (e.g. whether INACTIVE data transmission is supported, whether CG based solution is supported, whether CFRA (contention-free random access) based solution is supported, whether RACH based solution is supported, whether with RRC involved solution is supported, whether without RRC involved solution is supported), the information of supported solution can be per UE, per DRB, per logical channel, per logical channel group, per QoS flow, or per PDU session.

The INACTIVE data transmission failure information can include information of selected solution (e.g. CG based solution is selected, CFRA based solution is selected, RACH based solution is selected, with RRC involved solution is selected, without RRC involved solution is selected).

The INACTIVE data transmission failure information can include a status of radio resource (e.g. whether CG resource is valid, whether CFRA resource is valid, whether RACH resource with larger TB (Transport Block) size is valid, whether TA (Timing Advance) is valid).

The INACTIVE data transmission failure information can include information of configured radio resource for INACTIVE data transmission (i.e. valid radio resource): For RACH based solution, the configured separate PRACH (Physical Random Access Channel) resource pool, separate MsgA PUSCH (Physical Uplink Shared Channel) resource pool, separate CORESET (control resource set)/Search Space for Msg2/MsgB reception, the configured CFRA resource. For CG based solution, the configured PUSCH CG resource, configuration for DL transmission, configuration for beam management, configured resource for PUCCH (Physical Uplink Control Channel)/SRS (Sounding Reference Signal), configured TA validity check timer, the configured multiple sets of CG configuration.

The INACTIVE data transmission failure information can include information of selected radio resource for INACTIVE data transmission: the selected set of CG configuration.

The INACTIVE data transmission failure information can include information of ongoing data service type (e.g. 5QI, DRB ID, logical channel ID, logical channel group ID, QoS flow ID, PDU session ID).

The INACTIVE data transmission failure information can include a status of RLC, i.e. whether the RLC is released or not (when in INACTIVE state, the RLC may be suspended or released).

The INACTIVE data transmission failure information can include a configured area scope (in which the INACTIVE data transmission is allowed), the area scope can be for all UEs, or for a specific UE.

The INACTIVE data transmission failure information can include an indication to indicate that the UE has buffered data when the UE receives a release message from the NW (network).

The INACTIVE data transmission failure information can include an indication to indicate whether the information (e.g. BSR or INACTIVE data transmission request indication) has been sent to the NW.

The INACTIVE data transmission failure information can include an indication to indicate whether the data is included in the Msg3/MsgA when the UE is not the trigger (i.e. the NW is the trigger) for initial transmission type selection (e.g. initiate INACTIVE data transmission or resume to CONNECTED state, which type of INACTIVE data transmission to be performed: CG based or RACH based, with or without RRC involved).

The INACTIVE data transmission failure information can include information of fallback action (e.g. fallback from CG based to RACH based, from CFRA based to CBRA based, from without RRC involved to with RRC involved, fallback to normal resume: i.e. resume to CONNECTED state), The INACTIVE data transmission failure information can include information of configured fallback trigger: e.g. the N of N times failure (the fallback is triggered when N times failure is reached).

The INACTIVE data transmission failure information can include information of beam management: For RACH based INACTIVE data transmission, the time duration (with which the beam information derived based on the last RACH procedure is assumed valid), the beam information of the last RACH procedure, the beam information of the selected beam for INACTIVE data transmission, the time duration can be per cell, or per UE. For CG based INACTIVE data transmission, the pre-configured threshold (if any beam with CG resource above it, UE can initiate CG based, otherwise, UE initiates RACH based), the information of maintained SRS resource (to address the issue of beam change during INACTIVE data transmission).

The INACTIVE data transmission failure information can include an indication to indicate whether it is allowed to use the RACH resource or the CG resource according to which one comes first.

The INACTIVE data transmission failure information can include a configured value of CG response check timer.

The above INACTIVE data transmission failure information can be stored in the existing CEF (Connection Establishment Failure) report, RLF (Radio Link Failure) report, RA (Random Access) report or other specified report, or in a new specified report (e.g. INACTIVE data transmission failure report, IDTF report).

In step 208, the UE 202 can send the INACTIVE data transmission failure information to the network node 204 after the UE goes to CONNECTED state.

In step 210, the NW 204 may send to the UE 202 with updated configuration according to the received INACTIVE data transmission failure information. The updated configuration may include e.g. the threshold for buffered data size (the INACTIVE data transmission is allowed when the buffered data size is < or <=the threshold), the threshold for tolerant time (the INACTIVE data transmission is allowed when the tolerant time of the ongoing data service type is > or >=the threshold), the supported solution (e.g. whether INACTIVE data transmission is supported, whether CG based solution is supported, whether CFRA based solution is supported, whether RACH based solution is supported, whether with RRC involved solution is supported, whether without RRC involved solution is supported), the configured radio resource for INACTIVE data transmission (the configured separate PRACH resource pool, separate MsgA PUSCH resource pool, separate CORESET/Search Space for Msg2/MsgB reception, configured CFRA resource, the configured PUSCH CG resource, configuration for DL transmission, configuration for beam management, configured resource for PUCCH/SRS, configured TA validity check timer, the configured multiple sets of CG configuration), whether the RLC is allowed to be released when in INACTIVE state, the configured area scope (in which the INACTIVE data transmission is allowed), the time duration (with which the beam information derived based on the last RACH procedure is assumed valid), the pre-configured threshold (if any beam with CG resource above it, UE can initiate CG based, otherwise, UE initiates RACH based), the maintained SRS resource (to address the issue of beam change during INACTIVE data transmission), the value of CG response check timer, whether the INACTIVE data transmission is allowed, whether it is allowed to use the RACH resource or the CG resource according to which one comes first.

Example Embodiment 2

Figure 3:
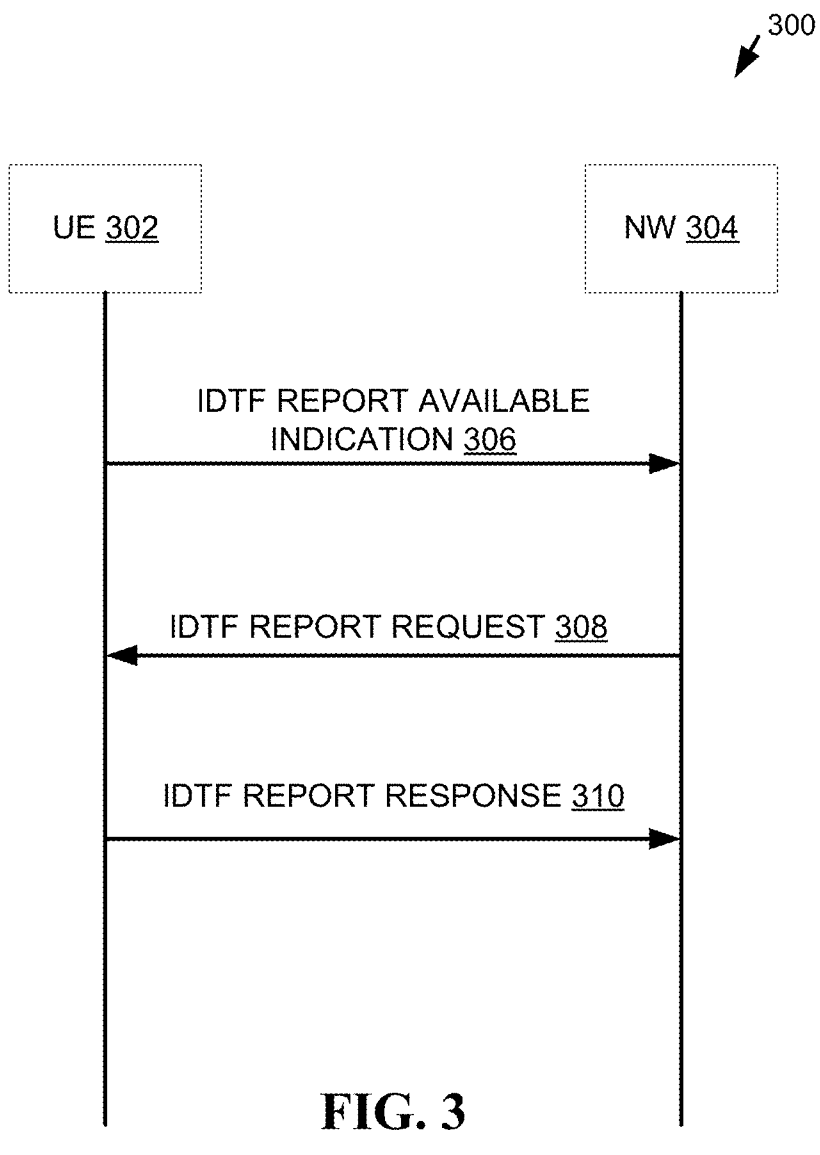
FIG. 3 is a signaling process of an example IDTF reporting process.

FIG. 3 is a signaling process 300 of an example IDTF reporting process. In step 306, when the IDTF report is adopted, the UE 302 can send an IDTF report available indication to the NW 304. This can be included in the RRCResumeComplete message, RRCReestablishmentComplete message, RRCReconfigurationComplete message, or RRCSetupComplete message to indicate the NW that the UE has IDTF report stored.

In step 308, the NW 304 may send an IDTF report request to the UE after received the IDTF report available indication from the UE.

In step 310, the UE 302 can send an IDTF report response to the NW carrying the IDTF report after received the IDTF report request from the NW.

The IDTF report request may be included in the UEInformationRequest message, the IDTF report response may be included in the UEInformationResponse message.

Example Embodiment 3

Figure 4:
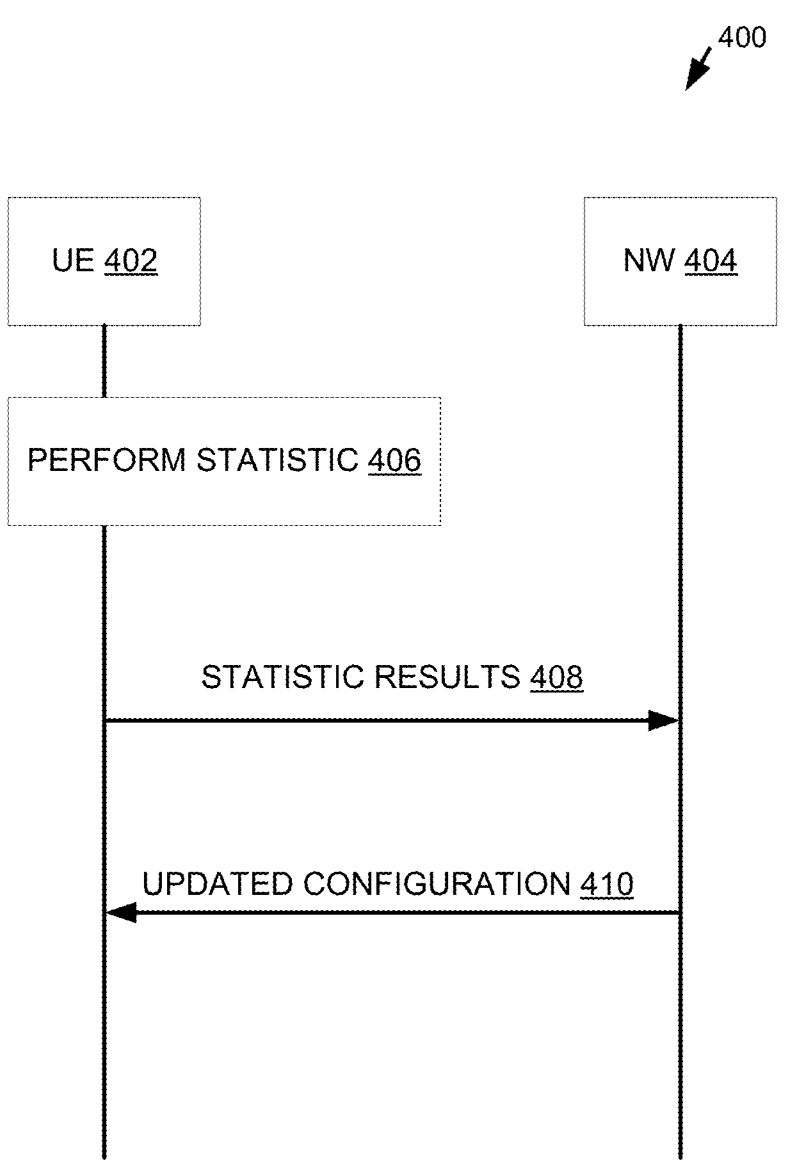
FIG. 4 is a signaling process for an example statistic reporting process.

FIG. 4 is a signaling process 400 for an example statistic reporting process. In step 406, during the INACTIVE data transmission, the UE 402 can derive at least one of the following statistics: UL data throughput per UE, DL data throughput per UE, UL Uu interface delay per UE, DL Uu interface delay per UE, UL data throughput per 5QI, DL data throughput per 5QI, UL Uu interface delay per 5QI, DL Uu interface delay per 5QI.

In step 408, the UE 402 can send the statistic result to the NW 404.

In step 410, The NW 404 may configure to the UE whether the INACTIVE data transmission is allowed for the UE according to the per UE statistic result, e.g. if the UL data throughput per UE is > or >=a threshold or the UL Uu interface delay per UE is > or >=a threshold, the data transmission is not allowed for the UE. Or the NW may configure to the UE whether the INACTIVE data transmission is allowed for a data service type or a QoS flow according to the per 5QI statistic result.

Example Embodiment 4

In some embodiments, the NW node can derive a statistic. During the INACTIVE data transmission, the NW can derive at least one of the following statistics: UL data throughput per cell, DL data throughput per cell, UL Uu interface delay per cell, DL Uu interface delay per cell.

The NW may configure to the UE whether the INACTIVE data transmission is allowed in a cell according to the per cell statistic result.

Example Embodiment 5

In some embodiments, the NW can configure to the UE to allow the UE to use the RACH resource or the CG resource according to which one comes first.

When the UE initiates an INACTIVE data transmission, the UE can use the RACH resource or the CG resource according to which one comes first, i.e. if the RACH resource comes first, to initiate a RACH based INACTIVE data transmission, if the CG resource comes first, to initiate a CG based INACTIVE data transmission.

Example Embodiment 6

In some instances, when the UE initiates a CG based INACTIVE data transmission, the UE starts a CG response check timer.

If the UE does not receive any of a feedback to a UL data, a DL data, or a DL signaling from the network before the CG response check timer is expired, the UE can consider the CG based INACTIVE data transmission is failed. The CG response check timer can be started upon initiating the CG based INACTIVE data transmission and stopped upon receiving a feedback to a UL data, a DL data, or a DL signaling from the network, or expired.

Example Embodiment 7

In some embodiments, if UE is in RRC_INACTIVE state and in out of coverage (OOC), when UE has UL data for transmission, the UE may not initiate the INACTIVE data transmission, UE keeps in RRC_INACTIVE state and starts a timer O, UE waits until the timer O expires or when back to normal coverage.

If UE is back to normal coverage before the timer O expires, UE may initiate the INACTIVE data transmission. If UE is still in OOC when the timer O expires, UE may perform at least one of the following: goes to RRC_IDLE state, informs the upper layer that the data transmission is failed due to UE being in OOC.

The value of timer O can be configured per cell, per data service type (e.g. per 5QI), per UE, per PDU session, per QoS flow, per DRB, per logical channel, or per logical channel group. The value of timer O can be configured by the network to the UE via system information or dedicated signaling.

Example Embodiment 8

If the INACTIVE data transmission is ongoing (e.g. the INACTIVE data transmission timer is running) and UE encounters OOC, UE can reset the INACTIVE data transmission timer to the value of timer O when the remaining time of INACTIVE data transmission timer is less than the value of timer O.

If UE is back to normal coverage before the timer O expires, UE can initiate the INACTIVE data transmission. If UE is still in OOC when the timer O expires, UE can perform at least one of the following: goes to RRC_IDLE state, informs the upper layer that the data transmission is failed due to UE being in OOC.

Example Embodiment 9

Figure 5:
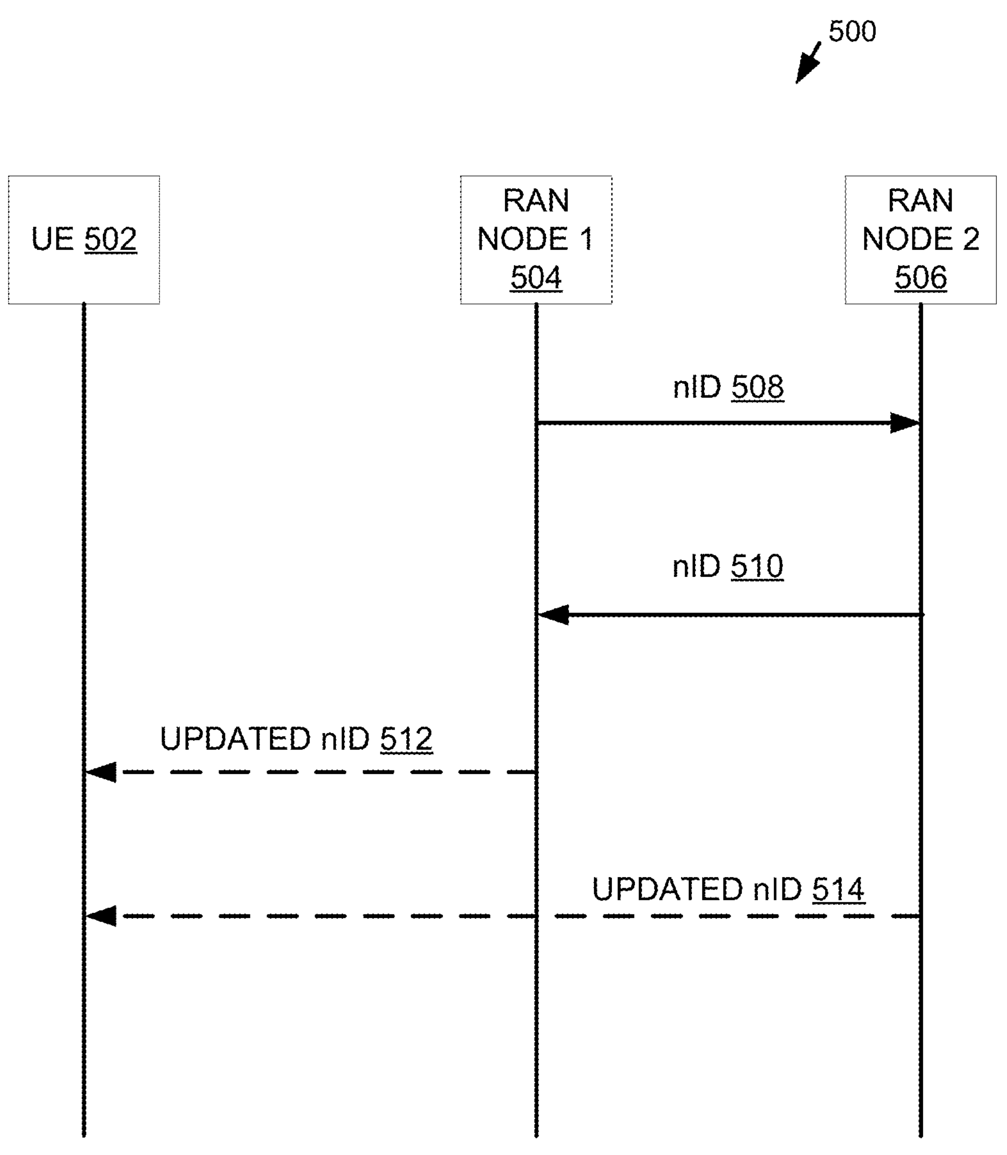
FIG. 5 is a signaling process of an example process for reporting a nID.

FIG. 5 is a signaling process 500 of an example process for reporting a nID. In step 508, RAN node 1 504 can send the MsgA PUSCH information to RAN node 2 506. The MsgA PUSCH information may carried in the XN SETUP REQUEST, NG-RAN NODE CONFIGURATION UPDATE message, or a new message.

In step 510, RAN node 2 506 can send the MsgA PUSCH information to RAN node 1 504. The MsgA PUSCH information may carried in the XN SETUP RESPONSE, NG-RAN NODE CONFIGURATION UPDATE ACKNOWLEDGE message, or a new message.

In step 512 and/or step 514, RAN node 1 504 and/or RAN node 2 506 may send the updated MsgA PUSCH information to the UE to avoid collision when the UE performs 2-step RACH.

The MsgA PUSCH information may be used to specify the PUSCH allocation for MsgA in 2-step RACH procedure, including at least one of: an nID, frequencyStartMsgA-PUSCH (Offset of lowest PUSCH occasion in frequency domain with respect to PRB 0), msgA-HoppingBits (Value of hopping bits to indicate which frequency offset to be used for second hop), msgA-IntraSlotFrequencyHopping (Intra-slot frequency hopping per PUSCH occasion), msgA-PUSCH-TimeDomainAllocation (Indicates a combination of start symbol and length and PUSCH mapping type from the TDRA table), msgA-PUSCH-TimeDomainOffset (A single time offset with respect to the start of each PRACH slot, counted as the number of slots), nrofMsgA-PO-FDM (Number of msgA PUSCH occasions FDMed in one time instance), nrofMsgA-PO-PerSlot (Number of time domain PUSCH occasions in each slot), nrofPRBs-PerMsgA-PO (Number of PRBs per PUSCH occasion), nrofSlotsMsgA-PUSCH (Number of slots containing one or multiple PUSCH occasions), startSymbolAndLengthMsgA-PO (An index giving valid combinations of start symbol, length and mapping type as start and length indicator for the first msgA PUSCH occasion).

The nID may include an identifier used to initiate data scrambling (i.e. the C_init) for MsgA on PUSCH. The nID may include a cell-specific parameter if configured (i.e. the msgA-dataScramblingIndex), otherwise the PCI (Physical cell ID) of the cell. When the nID of two neighbour cells (e.g. one belongs to RAN node 1, another belongs to RAN node 2) are different, the 2-step RACH relative collision may also can be avoided even when the other resource configurations for 2-step RACH are same, therefore the flexibility is improved.

Example Embodiment 10

In some embodiments, a DU can send the MsgA PUSCH information to CU. The MsgA PUSCH information may be carried in the GNB-DU CONFIGURATION UPDATE, or F1 SETUP REQUEST message.

The CU can send the MsgA PUSCH information to other RAN node (e.g. gNB, gNB-CU). The MsgA PUSCH information may be carried in the XN SETUP REQUEST, NG-RAN NODE CONFIGURATION UPDATE, XN SETUP RESPONSE, or NG-RAN NODE CONFIGURATION UPDATE ACKNOWLEDGE message.

The MsgA PUSCH information may be used to specify the PUSCH allocation for MsgA in 2-step RACH procedure, including at least one of: an nID, frequencyStartMsgA-PUSCH (Offset of lowest PUSCH occasion in frequency domain with respect to PRB 0), msgA-HoppingBits (Value of hopping bits to indicate which frequency offset to be used for second hop), msgA-IntraSlotFrequencyHopping (Intra-slot frequency hopping per PUSCH occasion), msgA-PUSCH-TimeDomainAllocation (Indicates a combination of start symbol and length and PUSCH mapping type from the TDRA table), msgA-PUSCH-TimeDomainOffset (A single time offset with respect to the start of each PRACH slot, counted as the number of slots), nrofMsgA-PO-FDM (Number of msgA PUSCH occasions FDMed in one time instance), nrofMsgA-PO-PerSlot (Number of time domain PUSCH occasions in each slot), nrofPRBs-PerMsgA-PO (Number of PRBs per PUSCH occasion), nrofSlotsMsgA-PUSCH (Number of slots containing one or multiple PUSCH occasions), startSymbolAndLengthMsgA-PO (An index giving valid combinations of start symbol, length and mapping type as start and length indicator for the first msgA PUSCH occasion).

The nID may be an identifier used to initiate data scrambling (i.e. the C_init) for MsgA on PUSCH. The nID is a cell-specific parameter if configured (i.e. the msgA-dataScramblingIndex), otherwise the PCI (Physical cell ID) of the cell.

Figure 6:
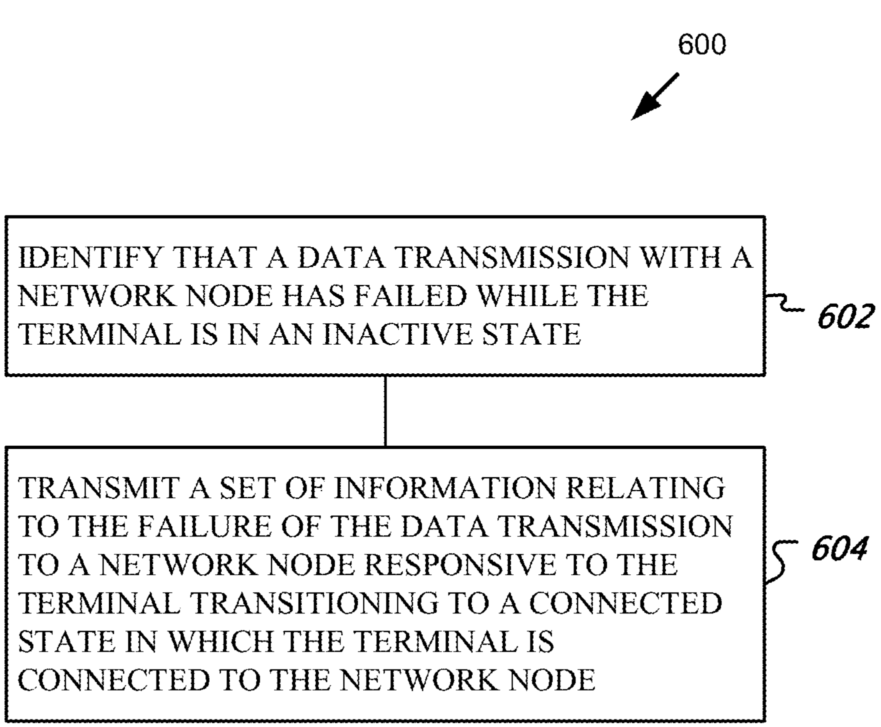
FIG. 6 illustrates a block diagram of an example method for data transmission in an inactive state.
Figure 7:
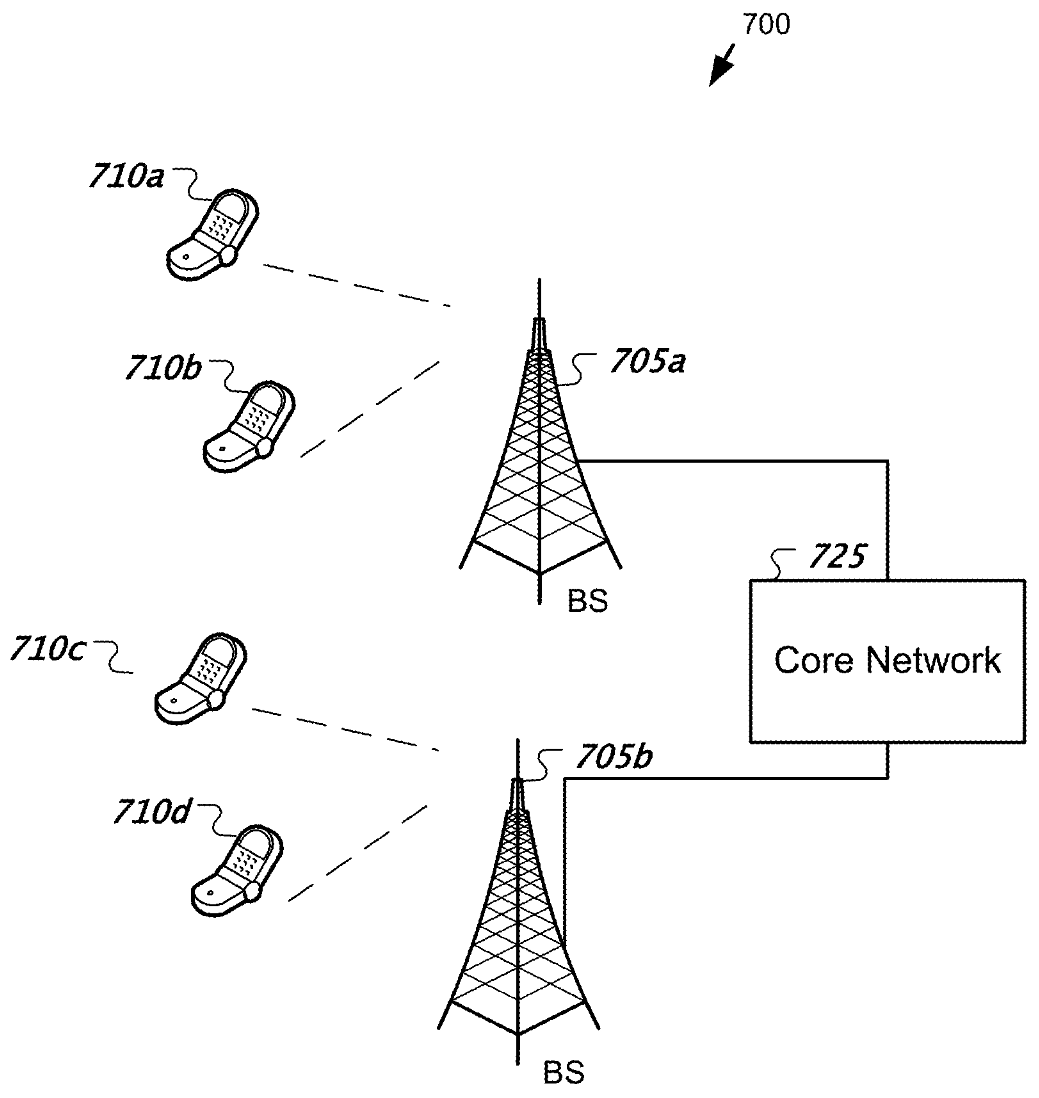
FIG. 7 shows an example of a wireless communication system where techniques in accordance with one or more embodiments of the present technology can be applied.
Figure 8:
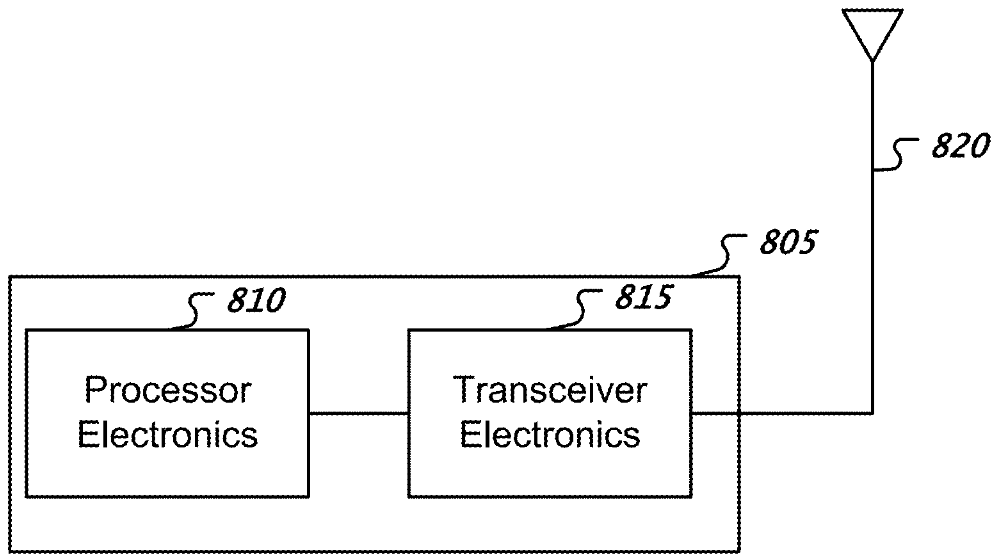
FIG. 8 is a block diagram representation of a portion of a hardware platform.

FIG. 6 illustrates a block diagram 600 of an example method for data transmission in an inactive state. The method can include identifying that a data transmission with a network node has failed while the terminal is in an inactive state (block 602). The terminal (or UE) can identify specific information relating to an inactive data transmission while being in an inactive state. The failure of the data transmission identified by the terminal can occur either in an initiation of an inactive data transmission or during an inactive transmission. The data transmission can include an inactive data transmission as described herein.

The method can also include transmitting a set of information relating to the failure of the data transmission to a network node responsive to the terminal transitioning to a connected state in which the terminal is connected to the network node (block 604). The set of information relating to the failure of the data transmission can include inactive data transmission failure information (e.g., inactive data transmission failure information message 208 sent from UE 202 to NW 204 as described in FIG. 2) as described herein.

In some embodiments, the set of information relating to the failure of the data transmission includes a failure cause for the failure of the data transmission.

In some embodiments, the failure cause includes any of: a maximum number of radio link control (RLC) re-transmissions, an expiration of a t310 timer, a beam failure recovery failure, a random access failure with a random access purpose of the data transmission in the radio resource control (RRC) inactive state, a configured grant (CG) based failure, an out of coverage failure, an expiration of a t319 timer, an expiration of an inactive data transmission timer, and an expiration of a CG response check timer.

In some embodiments, in the set of information relating to the failure of the data transmission includes an indication of whether the terminal or the network node triggered the data transmission.

In some embodiments, the set of information relating to the failure of the data transmission includes any of a threshold for a buffered data size, and a current buffered data size, wherein the threshold is per terminal, per data radio bearer (DRB), per logical channel, or per logical channel group, wherein the buffered data size is per terminal, per DRB, per logical channel, or per logical channel group.

In some embodiments, the set of information relating to the failure of the data transmission includes any of a threshold for a tolerant time, information relating to support solution(s), and information relating to a selected solution.

In some embodiments, the set of information relating to the failure of the data transmission includes any of a status of radio resource(s), information of configured radio resource(s) for the data transmission, information of a selected radio resource for the data transmission, information of an ongoing data service type, and a status of RLC.

In some embodiments, the set of information relating to the failure of the data transmission includes any of a configured area scope, an indication that the terminal has buffered data responsive to the terminal receiving a release message from the network node, an indication whether a buffer status report (BSR) or a data transmission request in inactive state has been sent to the network node, an indication whether a data has been sent to the network node included in a Msg3 or a MsgA, information of fallback action(s), information of a configured fallback trigger condition, and information for beam management.

In some embodiments, the set of information relating to the failure of the data transmission includes any of an indication of whether using a random-access channel resource or a CG resource according to which one comes first is allowed, and a configured value for a CG response check timer.

In some embodiments, the set of information relating to the failure of the data transmission is stored by the terminal in any of a Connection Establishment Failure (CEF) report, a Radio Link Failure (RLF) report, and a random-access report.

In some embodiments, the method includes receiving, by the terminal, an updated data transmission configuration from the network node responsive to transmitting the set of information relating to the failure of the data transmission to the network node.

In some embodiments, the set of information relating to the failure of the data transmission is included in an inactive data transmission failure (IDTF) report sent to the network node in an IDTF report response message.

In some embodiments, the method includes transmitting, by the terminal, an IDTF report available indication to the network node, wherein the IDTF report available indication is included in any of a RRCResumeComplete message, a RRCReestablishmentComplete message, a RRCReconfigurationComplete message, or a RRCSetupComplete message.

In some embodiments, the method includes receiving, by the terminal, an IDTF report request from the network node responsive to transmission of the IDTF report available indication, wherein the IDTF report request is included in a UEInformationRequest message; and transmitting, by the terminal, an IDTF report response to the network node responsive to receiving of the IDTF report request, wherein the IDTF report response is included in a UEInformationResponse message.

In some embodiments, the method includes deriving, by the terminal, a first statistic relating to the data transmission, the statistic including any of: an uplink data throughput for the terminal, a downlink data throughput for the terminal, an uplink Uu interface delay for the terminal, a downlink Uu interface delay for the terminal, an uplink data throughput for a 5G QoS Identifier (5QI), a downlink data throughput for the 5QI, an uplink Uu interface delay for the 5QI, and a downlink Uu interface delay for the 5QI.

In some embodiments, the network node is configured to derive a second statistic that includes any of an uplink data throughput for a cell, a downlink data throughput for the cell, an uplink Uu interface delay for the cell, and a downlink Uu interface delay for the cell.

In some embodiments, the network node is configured to determine any of: whether the data transmission is allowed for the terminal based on the first statistic and/or the second statistic, whether the data transmission in the RRC inactive state is allowed for a data service type or a quality of service (QoS) flow based on the first statistic relating to the 5QI, and whether the data transmission in the RRC inactive state is allowed for a cell based on the second statistic.

In some embodiments, the data transmission to the network node includes using a random-access channel (RACH) resource or a configured grant (CG) resource that is first detected by the terminal.

In some embodiments, the method includes initiating, by the terminal, a CG response check timer responsive to the data transmission to the network node, wherein the CG response check timer is stopped upon receiving a feedback from the network node, and wherein the terminal is configured to determine the data transmission to the network node as a failed transmission responsive to the expiry of the CG response check timer.

In some embodiments, the method includes initiating, by the terminal, an out of coverage timer when the terminal is in an inactive state and out of coverage of the network node, and the terminal is to initiate the data transmission, the terminal initiates the data transmission responsive to determining that the terminal is in coverage of the network node prior to the out of coverage timer expiring.

In some embodiments, the method includes resetting, by the terminal, an inactive data transmission timer to a value of an out of coverage timer responsive to determining that the terminal is out of coverage of the network node and the data transmission is ongoing and a remaining time of the inactive data transmission timer is less than the value of the out of coverage timer.

In some embodiments, the updated data transmission configuration from the network node includes any of a threshold for a buffered data size, a threshold for a tolerant time, information relating to support solution(s), information of configured radio resource(s) for the data transmission, an indication whether RLC is allowed to be released when in INACTIVE state, a configured area scope, a time duration within which a beam information derived based on a last RACH procedure is assumed valid, a threshold for determining to use CG based or RACH based solution, a configured sounding reference signal (SRS) resource to address beam change issue during the data transmission in the RRC inactive state, a value of CG response check timer, an indication whether the data transmission in the RRC inactive state is allowed, an indication whether it is allowed to use a RACH resource or a CG resource according to which one comes first.

Example Wireless System

FIG. 11 shows an example of a wireless communication system where techniques in accordance with one or more embodiments of the present technology can be applied. A wireless communication system 1100 can include one or more base stations (BSs) 1105*a*, 1105*b*, one or more wireless devices or terminals 1110*a*, 1110*b*, 1110*c*, 1110*d*, and a core network 1125. A base station 1105*a*, 1105*b* can provide wireless service to wireless devices 1110*a*, 1110*b*, 1110*c* and 1110*d* in one or more wireless sectors. In some implementations, a base station 1105*a*, 1105*b* includes directional antennas to produce two or more directional beams to provide wireless coverage in different sectors. The base station may implement functionalities of a scheduling cell or a candidate cell, as described in the present document.

The core network 1125 can communicate with one or more base stations 1105*a*, 1105*b*. The core network 1125 provides connectivity with other wireless communication systems and wired communication systems. The core network may include one or more service subscription databases to store information related to the subscribed wireless devices 1110*a*, 1110*b*, 1110*c*, and 1110*d*. A first base station 1105*a* can provide wireless service based on a first radio access technology, whereas a second base station 1105*b* can provide wireless service based on a second radio access technology. The base stations 1105*a* and 1105*b* may be co-located or may be separately installed in the field according to the deployment scenario. The wireless devices 1110*a*, 1110*b*, 1110*c*, and 1110*d* can support multiple different radio access technologies.

In some implementations, a wireless communication system can include multiple networks using different wireless technologies. A dual-mode or multi-mode wireless device includes two or more wireless technologies that could be used to connect to different wireless networks.

FIG. 12 is a block diagram representation of a portion of a hardware platform. A hardware platform 1205 such as a network node or a base station or a terminal or a wireless device (or UE) can include processor electronics 1210 such as a microprocessor that implements one or more of the techniques presented in this document. The hardware platform 1205 can include transceiver electronics 1215 to send and/or receive wired or wireless signals over one or more communication interfaces such as antenna 1220 or a wireline interface. The hardware platform 1205 can implement other communication interfaces with defined protocols for transmitting and receiving data. The hardware platform 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the hardware platform 1205.

CONCLUSION

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:

performing, by a terminal, a user data transmission with a network node while the terminal is in an inactive state, wherein the terminal starts an inactive data transmission timer upon initiation of the user data transmission in the inactive state;

determining, by the terminal, a failure of the user data transmission with the network node while the terminal is in the inactive state;

storing, by the terminal, a set of information about the failure of the user data transmission with the network node; and transmitting, by the terminal, the set of information about the failure of the user data transmission with the network node to the network node or another network node.

2. The method of claim 1, wherein the set of information about the failure of the user data transmission includes at least one of:

(1) a failure cause for the failure of the user data transmission, wherein the failure cause includes any of: a maximum number of radio link control (RLC) retransmissions, an expiration of a t310 timer, a beam failure recovery failure, a random access failure with a random access purpose of the user data transmission in a radio resource control (RRC) inactive state, a configured grant (CG) based failure, an out of coverage failure, an expiration of a t319 timer, an expiration of an inactive data transmission timer, or an expiration of a CG response check timer;

(2) a current buffered data size, wherein the current buffered data size is per terminal, per DRB, per logical channel, or per logical channel group; or (3) whether a Timing Advance (TA) is valid.

3. The method of claim 1, wherein the set of information about the failure of the user data transmission is stored by the terminal in any of a Connection Establishment Failure (CEF) report or a Radio Link Failure (RLF) report.

4. The method of claim 1, wherein the set of information about the failure of the user data transmission is included in an inactive data transmission failure report sent to the network node in an inactive data transmission failure report response message, the method further comprising:

transmitting, by the terminal, an inactive data transmission failure report available indication to the network node, wherein the inactive data transmission failure report available indication is included in any of a RRCResumeComplete message, a RRCReestablishmentComplete message, a RRCReconfigurationComplete message, or a RRCSetupComplete message;

receiving, by the terminal, an inactive data transmission failure report request from the network node responsive to transmission of the inactive data transmission failure report available indication, wherein the inactive data transmission failure report request is included in a UEInformationRequest message; and transmitting, by the terminal, an inactive data transmission failure report response to the network node responsive to receiving of the inactive data transmission failure report request, wherein the inactive data transmission failure report response is included in a UEInformationResponse message.

5. The method of claim 1, further comprising:

deriving, by the terminal, a first statistic relating to the user data transmission, the first statistic including any of: an uplink data throughput for the terminal, a downlink data throughput for the terminal, an uplink Uu interface delay for the terminal, a downlink Uu interface delay for the terminal, an uplink data throughput for a 5G QoS Identifier (5QI), a downlink data throughput for the 5QI, an uplink Uu interface delay for the 5QI, or a downlink Uu interface delay for the 5QI.

6. The method of claim 5, wherein the network node is configured to derive a second statistic that includes any of an uplink data throughput for a cell, a downlink data throughput for the cell, an uplink Uu interface delay for the cell, or a downlink Uu interface delay for the cell, and wherein the network node is configured to determine any of: whether the user data transmission is allowed for the terminal based on the first statistic and/or the second statistic, whether the user data transmission in an RRC inactive state is allowed for a data service type or a quality of service (QoS) flow based on the first statistic relating to the 5QI, or whether the user data transmission in the RRC inactive state is allowed for a cell based on the second statistic.

7. The method of claim 1, further comprising:

initiating, by the terminal, a CG response check timer responsive to the user data transmission to the network node, wherein the CG response check timer is stopped upon receiving a feedback from the network node, and wherein the terminal is configured to determine the user data transmission to the network node as a failed transmission responsive to an expiry of the CG response check timer.

8. The method of claim 1, further comprising:

initiating, by the terminal, an out of coverage timer when the terminal is in an inactive state and out of coverage of the network node, and the terminal is to initiate the user data transmission, the terminal initiates the user data transmission responsive to determining that the terminal is in coverage of the network node prior to the out of coverage timer expiring.

9. The method of claim 1, further comprising:

resetting, by the terminal, the inactive data transmission timer to a value of an out of coverage timer responsive to determining that the terminal is out of coverage of the network node and the user data transmission is ongoing and a remaining time of the inactive data transmission timer is less than the value of the out of coverage timer.

10. The method of claim 1, wherein the set of information about the failure of the user data transmission is stored by the terminal in a random-access report.

11. An apparatus for wireless communication comprising processor electronics that is configured to:

perform a user data transmission with a network node while the apparatus is in an inactive state, wherein the apparatus starts an inactive data transmission timer upon initiation of the user data transmission in the inactive state;

determine a failure of the user data transmission with the network node while the apparatus is in the inactive state;

store a set of information about the failure of the user data transmission with the network node; and transmit the set of information about the failure of the user data transmission with the network node to the network node or another network node.

12. The apparatus of claim 11, wherein the set of information about the failure of the user data transmission includes at least one of:

(1) a failure cause for the failure of the user data transmission, wherein the failure cause includes any of: a maximum number of radio link control (RLC) retransmissions, an expiration of a t310 timer, a beam failure recovery failure, a random access failure with a random access purpose of the user data transmission in a radio resource control (RRC) inactive state, a configured grant (CG) based failure, an out of coverage failure, an expiration of a t319 timer, an expiration of an inactive data transmission timer, or an expiration of a CG response check timer;

(2) a current buffered data size, wherein the current buffered data size is per apparatus, per DRB, per logical channel, or per logical channel group; or (3) whether a Timing Advance (TA) is valid.

13. The apparatus of claim 11, wherein the set of information about the failure of the user data transmission is stored by the apparatus in any of a Connection Establishment Failure (CEF) report or a Radio Link Failure (RLF) report.

14. The apparatus of claim 11, wherein the set of information about the failure of the user data transmission is included in an inactive data transmission failure report sent to the network node in an inactive data transmission failure report response message, wherein the processor electronics is further configured to:

transmit an inactive data transmission failure report available indication to the network node, wherein the inactive data transmission failure report available indication is included in any of a RRCResumeComplete message, a RRCReestablishmentComplete message, a RRCReconfigurationComplete message, or a RRCSetupComplete message;

receive an inactive data transmission failure report request from the network node responsive to transmission of the inactive data transmission failure report available indication, wherein the inactive data transmission failure report request is included in a UEInformationRequest message; and transmit an inactive data transmission failure report response to the network node responsive to receiving of the inactive data transmission failure report request, wherein the inactive data transmission failure report response is included in a UEInformationResponse message.

15. The apparatus of claim 11, wherein the processor electronics is configured to:

derive a first statistic relating to the user data transmission, the first statistic including any of: an uplink data throughput for the apparatus, a downlink data throughput for the apparatus, an uplink Uu interface delay for the apparatus, a downlink Uu interface delay for the apparatus, an uplink data throughput for a 5G QoS Identifier (5QI), a downlink data throughput for the 5QI, an uplink Uu interface delay for the 5QI, or a downlink Uu interface delay for the 5QI.

16. The apparatus of claim 15, wherein the network node is configured to derive a second statistic that includes any of an uplink data throughput for a cell, a downlink data throughput for the cell, an uplink Uu interface delay for the cell, or a downlink Uu interface delay for the cell, and wherein the network node is configured to determine any of: whether the user data transmission is allowed for the apparatus based on the first statistic and/or the second statistic, whether the user data transmission in an RRC inactive state is allowed for a data service type or a quality of service (QoS) flow based on the first statistic relating to the 5QI, or whether the user data transmission in the RRC inactive state is allowed for a cell based on the second statistic.

17. The apparatus of claim 11, wherein the processor electronics is configured to:

initiate a CG response check timer responsive to the user data transmission to the network node, wherein the CG response check timer is stopped upon receiving a feedback from the network node, and wherein the apparatus is configured to determine the user data transmission to the network node as a failed transmission responsive to an expiry of the CG response check timer.

18. The apparatus of claim 11, wherein the processor electronics is configured to:

initiate an out of coverage timer when the apparatus is in an inactive state and out of coverage of the network node, and the apparatus is to initiate the user data transmission, the apparatus initiates the user data transmission responsive to determining that the apparatus is in coverage of the network node prior to the out of coverage timer expiring.

19. The apparatus of claim 11, wherein the processor electronics is configured to:

reset the inactive data transmission timer to a value of an out of coverage timer responsive to determining that the apparatus is out of coverage of the network node and the user data transmission is ongoing and a remaining time of the inactive data transmission timer is less than the value of the out of coverage timer.

20. The apparatus of claim 11, wherein the set of information about the failure of the user data transmission is stored by the apparatus in a random-access report.

* * * * *